Figure 1:
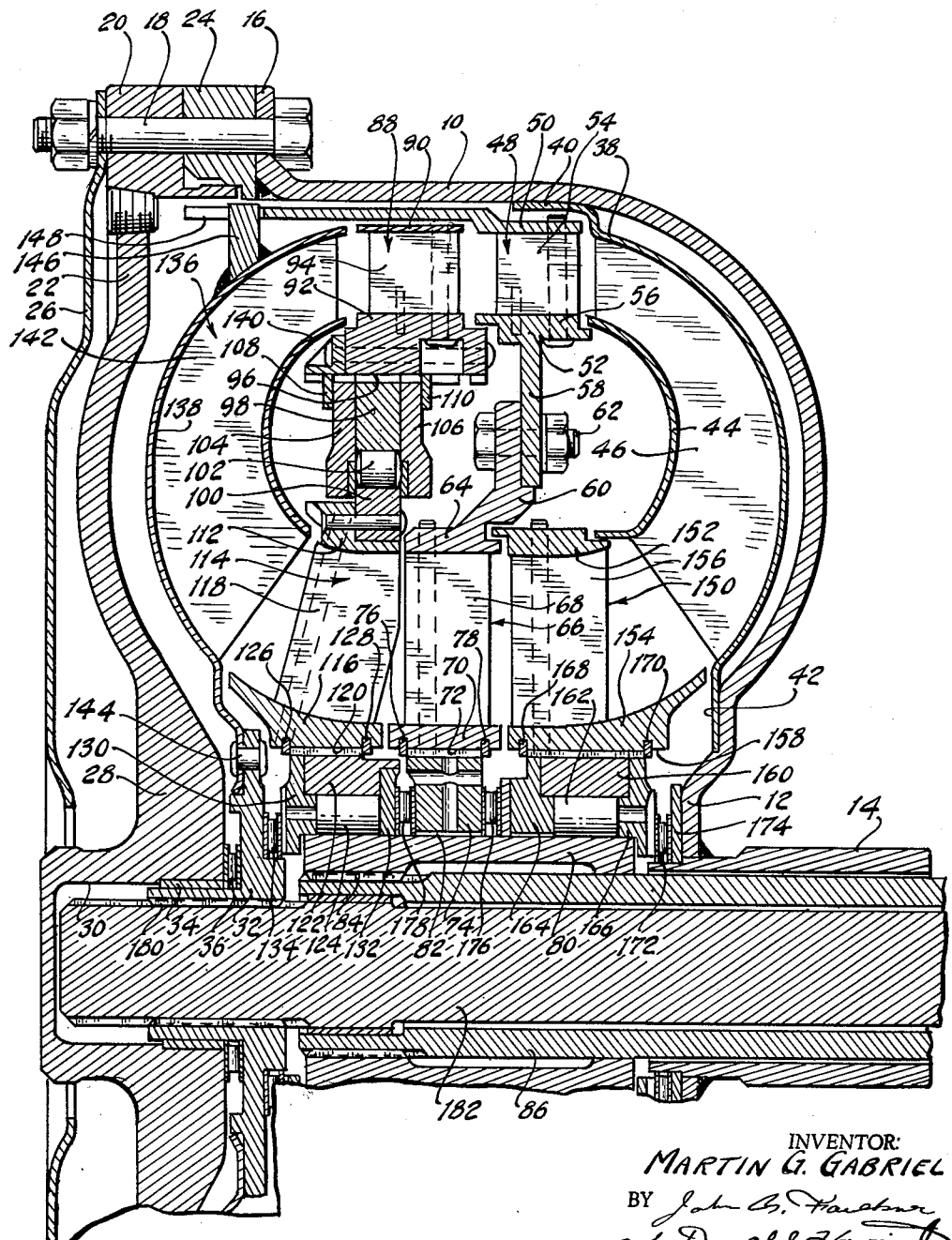

Jan. 5, 1965 M. G. GABRIEL 3,163,988
MULTIPLE ELEMENT HYDROKINETIC TORQUE CONVERTER
Filed June 13, 1963 3 Sheets-Sheet 1

INVENTOR:
MARTIN G. GABRIEL
BY
ATTORNEYS.

INVENTOR:
MARTIN G. GABRIEL

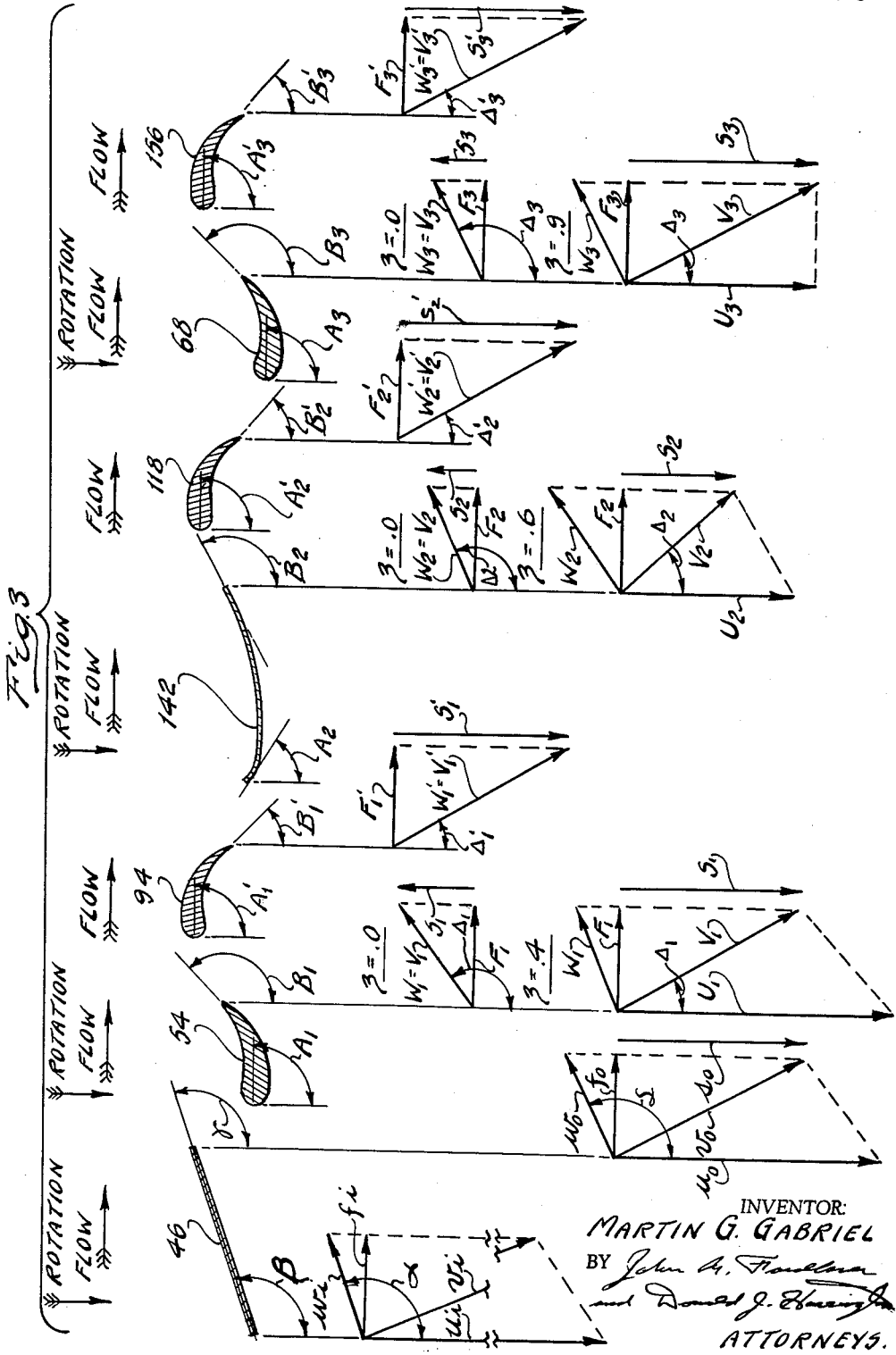

United States Patent Office 3,163,988
Patented Jan. 5, 1965

3,163,988
MULTIPLE ELEMENT HYDROKINETIC TORQUE
CONVERTER
Martin G. Gabriel, Dearborn, Mich., assignor to Ford
Motor Company, Dearborn, Mich., a corporation of
Delaware
Filed June 13, 1963, Ser. No. 287,693
2 Claims. (Cl. 60—54)

My invention relates generally to hydrokinetic torque transmitting mechanisms, and more particularly to a multiple element hydrokinetic torque converter having multiple stators that are arranged strategically to provide an increased torque multiplication for any given speed ratio and improved coupling efficiency.

In a preferred form of my invention, I have provided a torque converter mechanism having three turbines connected together for rotation in unison and three stators situated in toroidal fluid flow relationship in a torus circuit with the turbines and the converter impeller. One stator is situated at the exit section of each turbine. The third stator, which is located in the torus circuit at the exit region of the third turbine, functions to provide an optimum impeller entrance angle for the absolute fluid flow velocity vector at this point in the circuit. This optimum entrance condition is maintained throughout the torque conversion range.

Provision may be made for allowing the stators to freewheel at separate speed ratios during operation in the torque conversion range. I contemplate that the third turbine, which is located at the impeller exit region, will freewheel at a relatively high speed ratio, whereas the other stators that precede it will freewheel at lower speed ratios.

The provision of an improved hydrokinetic torque converter mechanism of the type above set forth being a principal object of my invenion, it is a further object of my invention to provide a multiple element torque converter unit having multiple turbine numbers and multiple stator members wherein a positive torque contribution by each of the turbine members can be obtained throughout the entire speed ratio range without adversely influencing the absolute fluid flow velocity vector entrance conditions at the impeller entrance region of the converter unit.

It is a further object of my invention to provide a multiple element hydrokinetic unit of the type above set forth wherein means are included for distributing turbine torque to a power output shaft through a simple clutch and brake arrangement thereby establishing a gearless infinitely variable torque ratio power transmitting path.

It is a further object of my invention to provide a mechanism of the type set forth in preceding objects wherein the clutch and brake arrangement includes a hill brake feature that permits braking torque to be developed under those conditions in which the turbines tend to overrun the impeller.

It is a further object of my invention to provide a mechanism as set forth in the preceding objects wherein the reverse torque reaction of the stators is utilized to establish a reverse drive condition.

Figure 2:
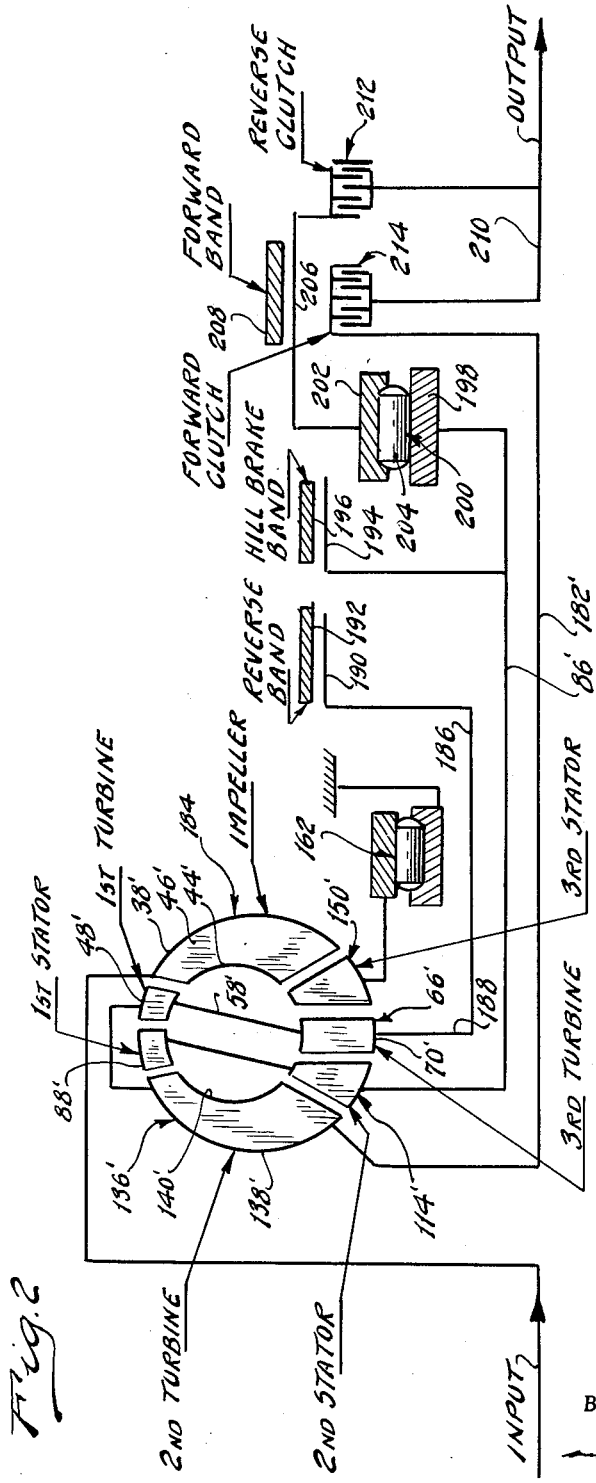

For the purpose of describing more particularly the improvements of my invention, reference will be made to the accompanying drawings, wherein, FIGURE 1 shows in cross sectional form an assembly view of my improved multiple element torque converter mechanism;

FIGURE 2 shows in schematic form a torque converter mechanism of the type shown in FIGURE 1 in combination with a clutch and brake system in a typical automotive vehicle drive line installation; and FIGURE 3 is a vector representation of the velocity vectors of a particle of fluid as it traverses the torus circuit of the converter mechanism of FIGURE 1.

Referring first to FIGURE 1, the impeller shell is shown at 10. It is formed with a generally toroidal shape and includes a hub 12 that is welded or otherwise secured to a sleeve shaft 14. This shaft may be mounted rotatably within a bearing opening formed in the stationary transmission housing structure.

The periphery of the shell 10 is flanged at 16, and it may be bolted by means of bolts 18 to the periphery 20 of a closure plate 22. In the structure shown, a spacer ring 24 is disposed between the periphery 16 and the periphery 20 although other arrangements also may be used.

A drive plate 26 is connected at its periphery to the periphery 20 of the plate 22. The bolts 18 provide this connection.

The drive plate 26 can be connected in a conventional fashion to the crankshaft of an internal combustion vehicle engine.

The plate 22 is formed with a hub 28 which is provided with a pilot opening 30. A turbine hub 32 is journalled by means of bushings 34 within the opening 30. A suitable thrust washer 36 is situated between the hub 28 and the hub 32.

An inner impeller shroud 38 is secured at its periphery 40 to the interior of the shell 10. It is secured also at 42 to the hub 12 of the shell 10. I contemplate that the connection between the shroud 38 and the shell 10 can be made by spot welding or by any other suitable manufacturing technique.

An inner impeller shroud is shown at 44. Impeller blades 46 are secured between the shrouds 44 and 38 and cooperate therewith to define radial outflow passages. The connection between the blades 46 and the shrouds 38 and 44 can be established by forming suitable slots in the shrouds through which tabs formed on the margins of blades 46 are received. The tabs can be deformed tangentially to establish a locking condition between the blades and the shrouds.

Located at the fluid flow exit region of the impeller is a first turbine generally identified by reference character 48. It includes an outer shroud in the form of a turbine ring 50 and an inner shroud 52. Disposed between the shrouds for turbine 48 are turbine blades 54. Blades 54 are pinned or otherwise secured to the first turbine shrouds, suitable pins 56 being provided for this purpose. A web member 58 is formed integrally with shroud 52 and bolted or otherwise secured to another web member 60. Bolts 62 may be used for this purpose.

Web member 60 defines an outer shroud 64 for a third turbine identified generally by reference character 66. This third turbine includes blades 68 disposed between shroud 64 and another shroud 70. It is situated at a radially inward region of the toroidal fluid flow circuit of the converter mechanism.

Shroud 70 defines a hub having an opening 72 which is splined to an externally splined adapter 74. Adapter 74 is held axially fast with respect to shroud 70 by snap rings 76 and 78. Adapter 74 is journalled upon a stationary sleeve shaft 80 by means of bushing 82. This shaft 80 is splined at 84 to a stator shaft 86 which may be connected in a fixed fashion to the stationary transmission housing.

Disposed at the flow exit region of the first turbine 48 is a first stator 88. This includes an outer shroud 90, an inner shroud 92 and stator blades 94 disposed between the shrouds. Blades 94 can be pinned or otherwise secured to shroud 92.

The inner race 92 for the first stator 88 is splined at 96 to an externally splined race 98 of an overrunning clutch assembly. This assembly includes also an inner race 100 and rollers 102 situated between the races. One of the races can be cammed to permit locking action of the rollers to occur. This allows relative freewheeling motion of the races in one direction but inhibits relative rotation in the opposite direction. The rollers 102 and the associated races are held axially fast by retainer plates 104 and 106. These in turn are held axially fast with respect to the outer race 92 by snap rings 108 and 110.

Race 100 is pinned or otherwise positively connected to a first race 112 of a second stator 114. This stator 114 includes also a second race 116 and stator blades 118 disposed between the races.

Race 116 is in the form of a hub having a splined opening 120 which receives an externally splined race 122. Overrunning brake elements in the form of rollers or sprags are situated between race 122 and the stationary sleeve shaft 80. These are indicated by reference character 124. The overrunning brake assembly is held axially fast by means of snap rings 126 and 128 which prevent axial movement with respect to the race 116.

Spacer elements 130 and 132 are situated on either side of the overrunning brake elements 124. Radial needle thrust bearings 134 are disposed between the spacer elements 130 and the hub 32 of the second turbine.

Overrunning brake elements 124 inhibit rotation of the second stator 114 in one direction but accommodate freewheeling motion thereof in the opposite direction. Overrunning brake elements 124 thus establish a one-way torque delivery path to the stationary housing from each of the stators 88 and 114.

The fluid flow exit region of the first stator 88 is situated adjacent the entrance region of a second turbine 136. This turbine includes an outer shroud 138 and an inner shroud 140. Second turbine blades 142 are situated between the shrouds and cooperate therewith to define radial inflow passages. The radially inward periphery of the shroud 138 is secured by rivets 144 to the hub 32. The turbines 48 and 136 are connected together for joint rotation by means of the element 50, as indicated. Element 50 is keyed by means of a dog and slot connection to outer shroud 138. This connection may comprise radially projecting elements 146 which may be welded or otherwise secured to the outer surface of shroud 138. These are received within slots 148 formed in the end of element 50.

A third stator is disposed between the fluid flow exit region of the second turbine 66 and the impeller. It is indicated generally by reference character 150, and includes a first shroud 152 and a second shroud 154. Third stator blades 156 are disposed between the shrouds. Shroud 154 is formed with an internally splined opening 158 which receives an externally splined overrunning brake race 160. Rollers or sprags 162 are situated between race 160 and stationary sleeve shaft 80 to establish a one-way braking action between the stator 150 and the sleeve shaft 80. It accommodates, however, overrunning freewheeling motion of the stator 150 during operation in the coupling range in the opposite direction.

Disposed on either side of the overrunning brake elements 162 are spacer members 164 and 166. These are held axially fast by snap rings 168 and 170 within the shroud 154.

Radial needle bearings 172 and a thrust washer 174 accommodate the axial thrust acting upon the stator 152. Another radial needle bearing 176 is situated between adaptor 74 and the spacer element 164. In similar fashion, another radial needle bearing 178 is situated between adaptor 74 and the spacer element 132.

The turbine hub 32 is splined at 180 to a driven turbine shaft 182. During operation of the torque converter mechanism, engine torque is delivered to the impeller thereby establishing toroidal fluid flow circulation. Each of the turbines is adapted to transmit driving torque to the shaft 182. During operation in the lower speed ratios, each of the stators is prevented from rotation by their respective overrunning brakes. When a speed ratio of approximately .40 is reached, however, the first stator 88 begins to freewheel thus establishing a first clutch point. As the speed ratio increases still further, the second stator continues to provide a change in the direction of the toroidal fluid flow velocity vector. After a speed ratio of .60 is reached, however, the second stator freewheels through the action of its overrunning brake. Torque multiplication continues during subsequent increases in speed ratio until a clutch point of approximately .9 is achieved. At this time, the third stator 150 begins to freewheel. Thereafter, the converter mechanism operates in a so-called coupling range at 1:1 torque ratio.

Referring next to FIGURE 2, I have illustrated a clutch and brake system that may be employed with a converter of the type described with reference to FIGURE 1. The converter portion of the structure in FIGURE 2 is identified generally by reference character 184. The elements of the converter structure 184 that have counterpart elements in the construction of FIGURE 1 have been indicated by corresponding reference characters although primed notations have been added. In the construction of FIGURE 2 the turbines are connected to shaft 182' as in the previous embodiment, shaft 182' corresponding to shaft 182 as explained previously. The turbines are connected also to a second turbine shaft 186 which is in the form of a sleeve shaft surrounding the stator shaft 86'. Shaft 186 is secured to a turbine hub 188 that in turn is connected to shroud 70' of the third turbine 66.

Sleeve shaft 186 is connected in turn to a reverse brake drum 190 around which is positioned a reverse brake band 192. Suitable fluid pressure operated servo means may be provided for selectively applying and releasing the band 192. In this way, the turbines can be held stationary or released.

Stator shaft 186' is connected to a brake drum 194 about which is disposed a hill brake band 196. This brake band may be applied to augment the hill braking capacity of the hydrokinetic mechanism by holding the stators stationary as the turbines overrun the impeller. The torque that then is transmitted from the turbines to the impeller and hence to the engine is supplemented by reverse action torque delivered through the medium of the hydrokinetic fluid to the stators and hence to the stationary transmission housing.

Stator sleeve shaft 86' is connected to an inner race 198 of an overrunning coupling generally identified by reference character 200. Coupling 200 includes an outer race 202 that may be cammed to cooperate with rollers 204 situated between the races. Rollers 204 will permit relative rotation of races in one direction, but will inhibit such rotation in the opposite direction.

Race 202 forms a part of a brake drum 206 about which is positioned a forward brake band 208. This band is applied during forward drive operation and functions to transmit stator reaction torque to the stationary transmission housing. It may be applied and released by means of a suitable fluid pressure operated servo. Brake band 196 may be operated in the same fashion with a separate fluid pressure opearted servo.

Drum 206 is drivably connected to power output shaft 210 through a selected engageable reverse friction clutch 212. This clutch is applied during reverse drive operation as will be explained subsequently. Power output shaft 210 may be connected directly to shaft 182' through a selectively engageable forward drive friction clutch 214.

During normal forward drive operation, the forward clutch 214 is applied. The turbines are effective to deliver turbine torque to the shaft 182' in the manner previously described, each turbine contributing a portion of the driving torque. The reverse torque reaction of the stators during operation of the converter in the torque conversion range is distributed through shaft 86' and through overrunning coupling 200 to the forward brake band 206.

Band 208 is applied to accommodate the torque reaction delivery to the stationary transmission housing.

To establish reverse drive operation, brake band 192 is applied and brake band 208 is released. Likewise the forward clutch 214, which was applied during forward drive operation, now is released.

To establish hill brake operation, the forward drive clutch 214 remains applied, and the hill brake band 196 is applied thereby anchoring the first and second stators to inhibit rotation thereof in either direction. This bypasses the overrunning coupling 200. If the output shaft then tends to overrun the power input shaft, a reaction torque will be applied to the stators and this in turn is delivered to the stationary transmission housing. The balance of the torque reaction, of course, is transmitted to the vehicle engine from the impeller. Effective hill braking capacity of the hydrokinetic unit is magnified in this fashion.

Referring next to FIGURE 3, I have illustrated the velocity vectors for a particle of fluid as it traverses the torus circuit of the hydrokinetic torque converter unit during operation of the torque converter unit at various speed ratios. For purposes of this diagram, the blade elements have been illustrated in an unwrapped condition to define a blade cascade. The normal torus flow is in the direction of the horizontal arrow and the direction of rotation is downward as viewed in FIGURE 3. The fluid flow entrance blade angle for the impeller blades 46 is designated by the symbol $\beta$. The blade exit angle is indicated by the symbol $\gamma$. The entrance blade angle for the turbine blades 54 is $A_1$. The exit blade angle for blades 54 is indicated by the symbol $B_1$. The entrance blade angle for the first stator is shown at $A_1'$ and the exit angle is shown at $B_1'$.

The blade entrance angle for the second turbine blades 142 is indicated by the symbol $A_2$. The second turbine blade exit angle is shown at $B_2$. The blade entrance angle for the second stator blades 118 is shown at $A_2'$ and the exit angle for the blades 118 is shown at $B_2'$.

The blade entrance angle for the third turbine blades 68 is shown at $A_3$ and the third turbine blade exit angle is shown at $B_3$.

The blade entrance angle for the third stator blades 156 is shown at $A_3'$ and the third stator exit angle is shown at $B_3'$.

According to a principal feature of my invention, the geometry of the blade elements and their strategic position within the torus circuit is such that a favorable entrance angle for the impeller blades 46 is achieved regardless of varying speed ratios. The symbol for speed ratio in the diagram of FIGURE 3 is $\eta$. The most desirable blade entrance angle for the impeller is one that will correspond to the angle of the absolute fluid flow velocity vector of a particle of fluid at the entrance region of the impeller blades. This is indicated by the vector $v_1$ in FIGURE 3. The normal flow for that particle of fluid at the entrance region of the impeller blades is indicated by the vector $f_i$ and the flow along the blades is shown at $w_i$. The rotation vector due to the rotation of the impeller blades is shown by the vector $u_i$. The vector $v_i$ represents the vectorial sum of the vectors $u_i$, $w_i$ and $f_i$. The angle of the absolute fluid flow velocity vector is shown at $\alpha$.

During operation of the mechanism at any speed ratio less than the final coupling point, which may be approximately .9 speed ratio, the entrance vector at the impeller entrance region is determined by the conditions that exist at the flow exit region of the third stator blades 156. The vectorial representation of a particle of fluid at this point in the circuit includes the vectors $F_3'$ and the vector $V_3'$. This latter vector, of course, also is equal to the flow vector along the blade, namely $W_3'$.

The vector $V_3'$ is the absolute fluid flow velocity vector at the exit region of the third stator blades. The tangential component of the absolute fluid flow velocity vector at this point is shown $S_3'$.

The angle of the absolute fluid flow velocity vector is indicated by the symbol $A_3'$. The angle $A_3'$ is slightly less than the angle $\alpha$ at low speed ratios and is slightly larger than the angle $\alpha$ at higher speed ratios. The blade angle $\beta$ is a compromise value that is somewhere between these two extremes, and this minimizes the degree of shock loss at this point in the torus circuit. The angle $A_3'$, however, does not deviate a great deal from the value of the angle $\alpha$, and for all practical purposes the entrance angle for the impeller is always favorable for optimum converter performance.

The flow vectors for a particle of fluid at the exit region of the impeller also are illustrated in FIGURE 3. The absolute fluid flow velocity vector at this point is shown at $v_o$. This is equal to the vectorial sum of the rotational vector $u_o$, the normal flow $f_o$ and the flow along the blade $w_o$. The angle formed by the absolute fluid flow velocity vector is indicated at $\delta$. The tangential component of the absolute fluid flow velocity vector at the exit region of the impeller is shown at $s_o$.

The magnitude of the moment of momentum applied to the particle of fluid by the impeller as it traverses the bladed passages of the impeller is equal to the mass of that particle times the difference in the tangential components of the absolute fluid flow velocity vector times the difference in the radii. This is a measure of the difference in the moments of momentum at the exit region of the third stator and the exit region of the impeller. It will be apparent that the moment of momentum applied to the particle of fluid is of a substantial magnitude since the length of vector $s_o$ is greater than the length of the vector $S_3'$. Also the operating radius of a particle of fluid at the exit region of the impeller is much greater than the operating radius of a particle of fluid at the exit region of the third stator.

As the torus flow traverses the bladed passages of the first turbine, a change in the moment of momentum is experienced. Its magnitude decreases which indicates that a positive driving torque is contributed by the first turbine.

The torque applied to the first turbine is determined by the difference in the moment of momentum of a particle of fluid at the exit region of the first turbine less the moment of momentum of a particle of fluid at the exit region of the impeller, the latter being equal, of course, to the moment of momentum at the entrance region of the first turbine. At stall or zero speed ratio, the tangential component of the absolute fluid flow velocity vector is shown at $S_1$. There is no rotational vector, of course. At this time the flow along the blade and the absolute fluid flow velocity vector are indicated at $W_1$ and $V_1$ respectively. The angle formed by the absolute fluid flow velocity vector is shown at $A_1$. The direction of the vector $S$ under zero speed ratio conditions is opposite to the direction of vector $s_o$. It is thus apparent that the change in the moment of momentum of the fluid as it traverses the first turbine bladed passages is substantial which indicates that a relatively large torque contribution is made by the first turbine at low speed ratios.

As the speed of the first turbine increases, a rotational vector $U_1$ is imparted to the particle of fluid. At a speed of about .4, the absolute fluid flow velocity vector then will change direction as indicated in FIGURE 3. The tangential component of the absolute fluid flow velocity vector now is in the same direction as the tangential component of the absolute fluid flow velocity vector $s_o$. It is shorter, however, which indicates that even at a speed ratio of .4 a positive torque contribution is being made by the first turbine although it is of a reduced magnitude.

At any speed ratio above .4, the first stator blades 94 are capable of redirecting the absolute fluid flow. The angle of the absolute fluid flow velocity vector at the exit region of the first stator blades is shown at $A_1'$ and is greater than the angle $A_1$ at any speed ratio less than .4. If the angle $A_1$ becomes greater than the angle $A_1'$, the first stator blades will freewheel since the overrunning coupling elements 102 are incapable of accommodating torque delivery in a reverse direction.

The normal flow at the exit region of the first stator is shown at $F_1'$ and the flow along the blade is of equal magnitude and has the same direction as the absolute fluid flow velocity vector. These vectors are shown at $W_1'$ and $V_1'$. The tangential component of the absolute fluid flow velocity vector is shown at $S_1'$.

As the particle of fluid traverses the second turbine bladed passages, the moment of momentum is decreased. The difference in the moment of momentum at the exit region of the blades 142 and the moment of momentum at the exit section of the preceding first stator blades is a measure of the torque contributed by the second turbine. At zero speed ratio the absolute fluid flow velocity vector at the exit region of the second turbine is shown by the vector $V_2$. This is equal in magnitude and direction to the flow along the blade $W_2$. The normal flow is shown at $F_2$ and the angle formed with the absolute fluid flow velocity vector is shown at $A_2$. At zero speed ratio the tangential component of the absolute fluid flow velocity vector $F_2$ is in a direction that is opposite to the direction of the absolute fluid flow velocity vector $S_1'$. Thus a definite reduction in the moment of momentum of the fluid as it traverses the second turbine blades is apparent. The operating radius at the exit section of the second turbine blades, of course, is less than the operating radius at the exit section of the first stator blades, which also indicates that a reduction in the moment of momentum takes place. This evidences a positive driving torque.

The tangential component of the absolute fluid flow velocity vector increases as the speed ratio increases and changes direction. Until the vector $S_2$ becomes equal in direction and magnitude to the direction and magnitude of the vector $S_1$, a positive torque contribution will be established. Thus the second turbine will contribute torque even after the first coupling point of .4 speed ratio is reached.

The second stator blades 118 redirect the fluid flow that leaves the exit region of the second turbine blades. The flow vectors at the exit region of the stator blades 118 include the absolute fluid flow velocity vector $V_2'$ which is equal in direction of magnitude to the vector for the flow along the blades $W_2'$. The normal flow is shown at $F_2'$ and the tangential component of the absolute fluid flow velocity vector is shown at $S_2'$. These vectors describe the entrance conditions for the third turbine blades 68. The vectors at stall for the third turbine blades 68 are shown in FIGURE 3 as well as the corresponding vectors at the clutch point of .9 speed ratio. At stall, the tangential component of the absolute fluid flow velocity vector $V_3$ of the third turbine is in a direction that is opposite to the direction of rotation and is of a reduced magnitude. The angle of the absolute fluid flow velocity vector $V_3$ is shown at $A_3$. Thus a substantial reduction in the moment of momentum of the fluid as it traverses the third turbine blades is experienced, which indicates a positive torque contribution. As the rotational vector $U_3$ is imparted to the particle, the direction of the vector $S_3$ reverses and its magnitude increases. Up until the time the second coupling point of a .6 speed ratio is achieved, the vector $S_3$ is of a lesser length than the vector $S_2'$. After the second clutch point of a .6 speed ratio is achieved, however, the third turbine still is capable of contributing a positive torque to the power output shaft since vector $S_3$ will be of a lesser magnitude than the vector $S_2$ for a particle of fluid at the exit region of the blades 142. This condition will be maintained until the final coupling point is reached.

I am aware of a known, prior art, multiple turbine converter construction in which the discontinuities in the bladed passages defined by the converter blades occur at locations at which a change in the moment of momentum takes place during operation. This is in sharp contrast to my improved converter construction wherein the corresponding blade discontinuities occur at regions of constant maximum or minimum radii. Since this is true, no change in the moment of momentum occurs at these discontinuities, and efficiency is improved accordingly. This characteristic is not shown or suggested by any prior art teachings.

I am aware also of a multiple element converter construction which includes plural turbines wherein the final turbine stage is located directly adjacent the entrance region of the impeller. A counterpart for stator 150 is lacking. For purposes of comparison, it will be apparent that if the stator 150 were to be removed, the absolute fluid flow velocity vector $V_3$ would be the vector that is received by the entrance region of the impeller. Since the vector $V_3$ at stall is substantially 90° out of phase with respect to the vector $v_i$, the torque required to establish any given moment of momentum at the exit region of the impeller thus would be increased. This, of course, would reduce the stall speed, but it would reduce also the operating efficiency correspondingly. As the rotational vector $U_3$ is applied to a particle of fluid at the exit region of the blades 68, the vector $V_3$ would become substantially equal in magnitude and direction to the vector $v_i$. This would occur at the higher speed ratios as indicated in FIGURE 3. Thus the impeller speed for any given engine torque would increase rapidly as the speed ratio increases. At any speed ratio less than the final coupling point of .9, however, the vector $s_0$ would be less than it would be if the stator blades 156 were in the circuit. Thus an augmentation in the tangential component of the absolute fluid flow velocity will not occur unless the blades 156 are arranged as I have shown them.

In defining the structural characteristics of my improved converter, the claims recite separate turbine blade discontinuities that are situated within the toroidal circuit at a substantially constant maximum or minimum radius. The expression "substantially constant radius," for purposes of interpreting the claims, shall mean "having a very small deviation from an absolute, unchanging radius." Normal manufacturing tolerances and other slight deviations that might occur during actual construction of my improved converter are not deemed to be variations in radius.

Having thus described a preferred embodiment of my invention, what I claim and desire to secure by U.S. Letters Patent is:

1. A hydrokinetic torque converter mechanism comprising a bladed impeller, a plurality of bladed turbines and a plurality of bladed stators situated in toroidal fluid flow relationship in a common torus circuit, said bladed impeller being located at a radial outflow region of said circuit, a first turbine located at a radially outward region of said circuit adjacent the flow exit section of said impeller, a first stator located at said radially outward region adjacent the flow exit section of said first turbine, a second turbine located at a radial inflow region of said circuit, the fluid flow path extending from the flow exit section of said impeller to the flow entrance section of said second turbine being at a substantially constant and maximum radius, a second stator and a third turbine located at a radially inward region of said circuit, said turbines being connected together for rotation in unison, and a third stator situated in said radially inward region between the flow exit section of said third turbine and the flow entrance section of said impeller, the fluid flow path extending from the flow exit section of said second turbine to the flow entrance section of said impeller being at a substantially constant and minimum radius, said turbines forming a composite bladed torque transmitting assembly with two turbine blade discontinuities, one discontinuity being located at the portion of said outward region that is occupied by said first stator, and the second discontinuity being located at the portion of said inward region that is occupied by said second stator, each discontinuity being characterized by a substantially constant operating radius of the path of the mean toroidal fluid flow that passes through it.

2. A hydrokinetic torque converter mechanism comprising a bladed impeller, a plurality of bladed turbines and a plurality of bladed stators situated in toroidal fluid flow relationship in a common torus circuit, said bladed impeller being located at a radial outflow region of said circuit, a first turbine located at a radially outward region of said circuit adjacent the flow exit section of said impeller, a first stator located at said radially outward region adjacent the flow exit section of said first turbine, the fluid flow path extending from the flow exit section of said impeller to the flow entrance section of said second turbine being at a substantially constant and maximum radius, a second turbine located at a radial inflow region of said circuit, a second stator and a third turbine located at a radially inward region of said circuit, said turbines being connected together for rotation in unison, a third stator situated in said radially inward region between the flow exit section of said third turbine and the flow entrance section of said impeller, the fluid flow path extending from the flow exit section of said second turbine to the flow entrance section of said impeller being at a substantially constant and minimum radius, an overrunning coupling connection between said first stator and said second stator, a second overrunning coupling connection between said second stator and a stationary portion of said mechanism whereby said first and second stators are adapted to freewheel independently upon achieving the respective coupling points, and a third overrunning coupling connection between said third stator and said secondary portion of said mechanism whereby a third coupling point can be achieved independently of the operation of said first and second stators, and turbines forming a composite bladed torque transmitting assembly with two turbine blade discontinuities, one discontinuity being located at the portion of said outward region that is occupied by said first stator, and the second discontinuity being located at the portion of said inward region that is occupied by said second stator, each discontinuity being characterized by a substantially constant operating radius of the path of the mean toroidal fluid flow that passes through it.

References Cited by the Examiner
UNITED STATES PATENTS
2,762,196   9/56   Ullery _____ 60—54

JULIUS E. WEST, *Primary Examiner.*